United States Patent
Grulick et al.

[11] Patent Number: 5,904,037
[45] Date of Patent: May 18, 1999

[54] FIBER OPTIC CABLE REVERSAL POINT MARKING PROCESS AND A MARKING DEVICE FOR USE THEREWITH

[75] Inventors: Matthew J. Grulick, Hickory; Rodney Burns, Conover, both of N.C.

[73] Assignee: Siecor Corporation, Hickory, N.C.

[21] Appl. No.: 08/873,511

[22] Filed: Jun. 12, 1997

[51] Int. Cl.⁶ .................................................. D01H 7/46
[52] U.S. Cl. .............................. 57/264; 57/293; 174/112; 385/103; 385/104
[58] Field of Search ..................... 57/293, 264; 174/112; 385/103, 104

[56] References Cited

U.S. PATENT DOCUMENTS

| | | | |
|---|---|---|---|
| 3,589,118 | 6/1971 | Strelow et al. | 57/34 |
| 3,664,108 | 5/1972 | Strelow et al. | 57/34 |
| 4,224,788 | 9/1980 | Vogelsberg | 57/294 |
| 4,266,398 | 5/1981 | Vogelsberg | 57/293 |
| 4,359,857 | 11/1982 | Oestreich | 57/18 |
| 4,386,496 | 6/1983 | Oestreich | 57/293 |
| 4,429,521 | 2/1984 | Oestreich | 57/294 |
| 4,828,352 | 5/1989 | Kraft | 350/96.23 |
| 4,833,871 | 5/1989 | Ogawa et al. | 57/293 |
| 4,856,266 | 8/1989 | Ogawa et al. | 57/293 |
| 4,880,484 | 11/1989 | Obermeier et al. | 156/51 |
| 4,960,318 | 10/1990 | Nilsson et al. | 350/96.23 |
| 4,973,238 | 11/1990 | Kihlken et al. | 425/105 |
| 5,042,904 | 8/1991 | Story et al. | 385/105 |
| 5,119,464 | 6/1992 | Freychet et al. | 385/147 |
| 5,379,363 | 1/1995 | Bonicel et al. | 385/114 |
| 5,474,627 | 12/1995 | Carriere et al. | 156/47 |
| 5,498,145 | 3/1996 | Sikora et al. | 425/71 |
| 5,703,983 | 12/1997 | Beasley, Jr. | 385/104 |
| 5,729,966 | 3/1998 | Grulick | 57/293 |
| 5,745,628 | 4/1998 | Benzel et al. | 385/104 |
| 5,809,194 | 9/1998 | Lovie | 385/104 |

FOREIGN PATENT DOCUMENTS 43-59504  8/1968  Japan.

*Primary Examiner*—William Stryjewski
*Attorney, Agent, or Firm*—Timothy J. Aberle

[57] ABSTRACT

A manufacturing process (10) for producing a product (50,50') comprises a product making section (20) and an operation section (60). Product making section (20) is operative to produce, for example, a complete but unmarked cable product (50). Operation section (60) is operative to affect a manufacturing operation on product (50), for example, indent marking of reversal points of product (50). A completed product (50') comprising markings over reversal points is then stored on a product storage device comprising a take-up reel (98).

39 Claims, 5 Drawing Sheets

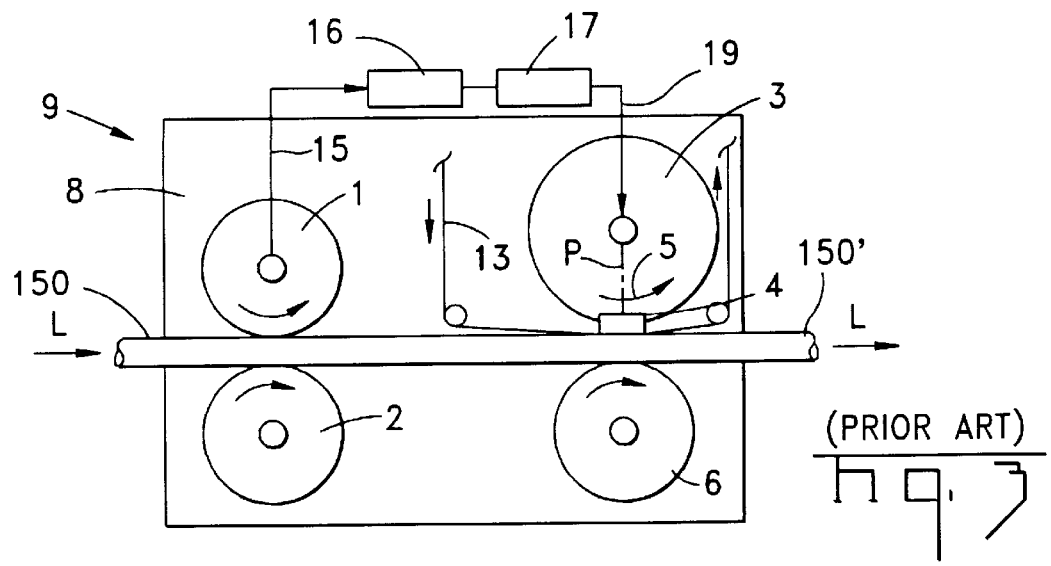
(PRIOR ART) Fig. 3
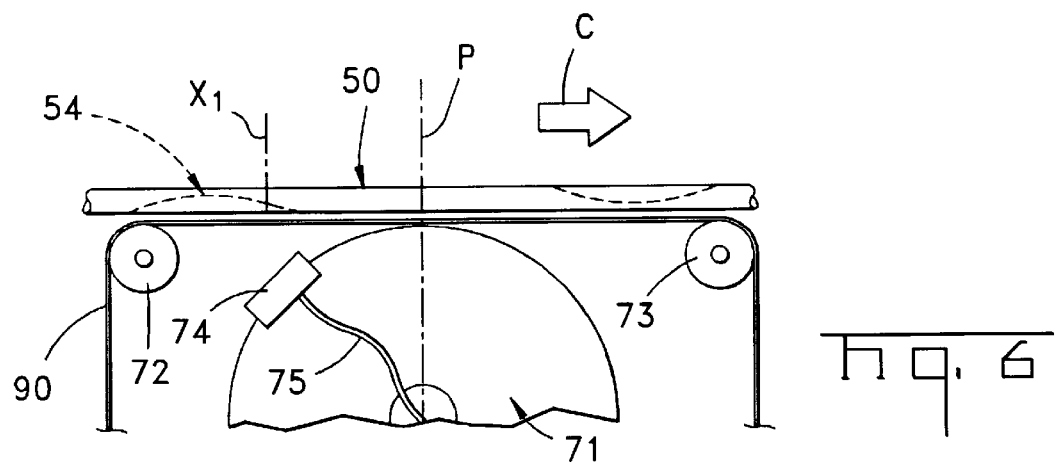
Fig. 6
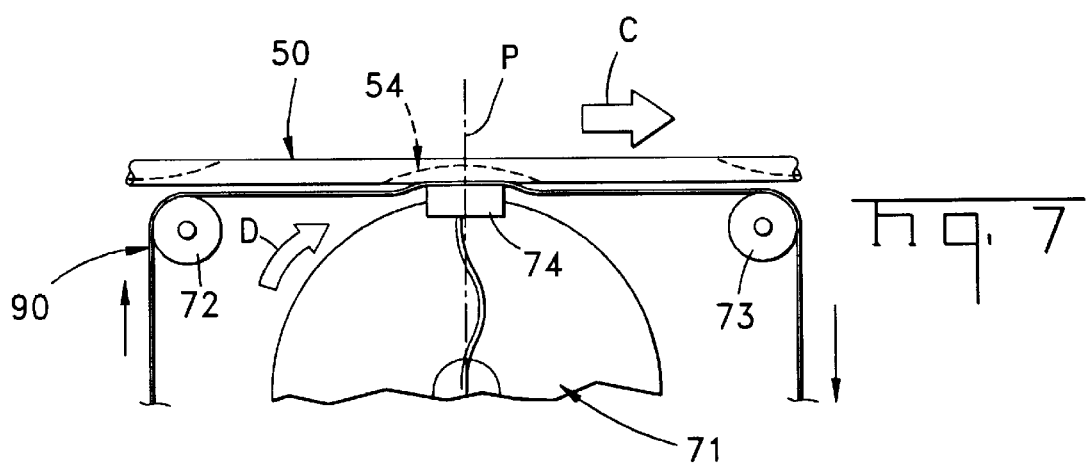
Fig. 7

FIBER OPTIC CABLE REVERSAL POINT MARKING PROCESS AND A MARKING DEVICE FOR USE THEREWITH

The present invention relates to a manufacturing process and to an apparatus for performing an operation on a product, which apparatus is used in the process to, for example, make a permanent mark on a cable product.

Conventional fiber optic cables comprise optical fibers which transmit information in the form of light signals. Such cables are used to transmit telephone, cable television, and computer information. A conventional fiber optic cable 150 is shown in FIG. 1. Cable 150 is of the ALTOS type manufactured by the SIECOR Corporation of Hickory, N.C. Cable 150 typically includes a marking comprising the manufacturer's name and product information (not shown). The marking may also include product specifications, length markings, a color code, or any other useful information.

Cable 150 includes a central member 121 surrounded by buffer tubes 122. Buffer tubes 122 include optical fibers therein. Buffer tubes 122 are surrounded by a water swellable tape material 123. Binders 126 bind buffer tubes 122 and tape 123 together. Central member 121, buffer tubes 122, and water swellable tape 123 define a core 125. Core 125 is protectively surrounded by a durable jacket 152. During the process of manufacturing cable 150, buffer tubes 122 are stranded about central member 121 in alternating lay directions. More specifically, tubes 122 are typically stranded in a first lay direction, the lay direction is then reversed, and buffer tubes 122 are stranded in a second lay direction about central member 121. Each location along the tubes at which the lay direction is reversed is termed a reversal point, e.g. as indicated by reversal point 54 in FIG. 1. The stranding of buffer tubes 122 in the foregoing fashion is termed the S-Z stranding method, an advantage of which method is that a craftsman can access extra buffer tube and fiber lengths at the reversal points.

Cables made by the S-Z stranding method facilitate the making of splices to, and connectorization of, fibers in the cable in what is termed a taught sheath, mid-span access operation for branch connections. When a cable 150 is, for example, supported between two poles, and a craftsman desires to make a splice to a given fiber, the craftsman will first cut jacket 152 to gain access to a buffer tube 122 and the fibers therein. However, in order to make the splice, the craftsman needs some length of slack in the buffer tube. As noted above, an advantage of the S-Z stranding method is that the buffer tube and fiber lengths are longer than the cable length. The craftsman uses the extra tube and fiber lengths as slack to make the splice. However, since the material of jacket 152 is not transparent it is impossible for the craftsman to see where the reversal point is. The craftsman will therefore randomly select a place to cut the cable and, if he is lucky, the cut will be made at or adjacent to a reversal point. Very often the cut is not made at or adjacent to a reversal point and, since the shortest distance between the reversal points is potentially about 600 mm, the craftsman may be forced to expose up to about a 1000 mm of cable. This will result in a large amount of excess exposed cable, which is undesirable because the craftsman must then protect the exposed cable by placing it into a splice enclosure and/or wrapping the cable with a field-installed sheath. Splice enclosures are designed to enclose splices and fiber connections; consequently, there is not much remaining room to house the excess exposed cable. Due to the storage of the excess exposed cable in the splice enclosure, the making of fiber splices and connections becomes more difficult for the craftsman to perform because he has less room to work. In view of the above, what was needed was a means of reversal point identification whereby the craftsman could rely with certainty that the cut would be at generally the precise location of a reversal point.

The assignee of the present invention has solved the foregoing problem by developing a cable manufacturing process whereby, for example, the cable comprised reversal point marks formed on the jacket indicating generally the precise locations of reversal points. The assignee's U.S. patent application Ser. No. 08/675,201, hereinafter the '201 application, describes methods and apparatuses for marking the cable jacket at reversal points. A method described in the '201 application comprises a computer which tracks the locations of reversal points as the cable is being manufactured. When the reversal point reaches a controlled print station, the computer sends a signal to the print station thereby activating the print station. The print station then marks the reversal point with, for example, an ink jet printer. However, although the ink applied to the reversal point is applied at the correct reversal point location, the ink may become worn off or smudged. If this occurs, the reversal point locations may become illegible because the markings were not altogether permanent.

Essentially permanent length marks have been formed on cable products by conventional marking machines, for example, a hot foil type indent marking machine 9 as shown in FIG. 3. However, as discussed below, conventional marking system 9 is not a solution for the reversal point locating and marking problem. Markings made by machine 9 include length markings or other useful information. Marking machine 9 includes a frame 8 having rotatably mounted components including a follower wheel 1, a print head 3, and guide rollers 2 and 6. Follower wheel 1 is frictionally engaged with unmarked cable length 150. Additionally, follower wheel 1 is operatively connected to print head 3 by an encoder 15, a motion control computer (MCC) 16, a servo-motor 17, and a schematically shown drive link 19. In operation, as follower wheel 1 rotates at a given line speed, encoder 15 sends an electronic signal to MCC 16. MCC 16 is programmed to control servo-motor 17. Drive link 19 comprises a rotatable shaft or belt which is attached to print head 3. Print head 3 will make a mark on the cable per an amount of meters or feet. MCC 16 sends a signal to servo-motor 17, which begins rotating link 19 and print head 3 in a rotational direction 5. MCC 16 is programmed to drive print head 3 at a constant ratio, based on the respective radii of each wheel, i.e. the ratio could be X:1 for meters and Y:1 for feet.

Print head 3 has a conventional, heated marking device comprising a print head 4 mounted thereto having a hot foil type marking device. Marking device 4 is mounted at a fixed radius on print head 3, and it comprises a heated surface which faces cable 150. The heated surface includes a configuration of letters and/or numbers comprising the marking to be formed on the cable. A conventional heat-sensitive tape material 13 is disposed between print head 4 and cable length 150.

During a cable manufacturing process, cable length 150 moves in a line direction L. As described above, MCC 16 will drive the rotation of print head 3 in rotational direction 5. Print head 4 thus rotates and becomes pressingly engaged with a heat sensitive tape material 13, thereby pressing tape material 13 against cable 150. Heat flows from print head 4 into tape material 13 and cable 150, which causes a deposit of tape material 13 to be impressed upon cable 150. A marked cable length 150' is thus produced.

Print head 3 is designed to slavishly rotate, making one marking per fixed distance along the cable length in a fixed ratio with follower wheel 1, for example, in feet or meters. MCC 16 and servo-motor 17 are suitable for only fixed distance marking. This is problematic in the reversal point marking context because, due to manufacturing variances, the respective distances between pairs of reversal points 54 may not be constant. The accumulative effect of the variances, over several thousands of meters of cable, make fixed distance marking virtually impossible. Therefore, MCC 16 and servo-motor 17 are not capable of driving print head 3 to mark reversal points.

Further, marking machine 9 is often part of a cable production line, e.g. where fiber optic cable is being produced. It is desirable for a given cable production line to produce cable with different nominal distances between the metric or footage markings. The required markings, however, depend upon the customer's requirements. The fixed radius of print head 3 renders print head 3 satisfactory for one length increment between print marks but not necessarily for others. Therefore, conventional marking machinery requires an inventory of print heads of differing radii to be kept on hand to accommodate the need for different incremental print distances in meters or feet. In some cases an inventory of entire machines capable of marking meters or feet must be kept on hand. Such a parts and/or machinery inventory undesirably contributes to capital and labor expenditures and storage costs. Moreover, stress on the cable causes strain which is, at best, only manually accounted for in conventional marking machinery.

What is needed, therefore, is an apparatus and a method for performing an operation on a product, for example, a reversal point marking apparatus and method which will make reversal point markings along a cable at generally the precise locations of reversal points, whereby the reversal point markings are permanent.

OBJECTS OF THE INVENTION

It is an object of the present invention to provide a manufacturing operation which accounts for stress-induced strain of a product.

It is an object of the present invention to provide an apparatus and method for producing a cable product whereby a craftsman will be able to locate a marking on the cable and cut the cable at or near a reversal point, thereby facilitating a mid-span access process for splicing or connectorization.

It is an object of the present invention to provide a method and apparatus which permanently and reliably marks reversal points on an S-Z stranded cable product.

It is another object of the present invention to provide an automated system which is operative to control a marking device, on an on demand basis, for permanently marking reversal points on a cable product.

It is an object of the present invention to provide a single marking device which is suitable for various incremental distances between print marks.

BRIEF DESCRIPTION OF THE DRAWINGS

FIG. 3 is a schematic view of a conventional cable marking machine.

FIG. 6 is a detailed view of the print head according to the present invention when in a ready mode.

FIG. 7 is a detailed view of the print head according to the present invention when in an active mode marking a cable product.

DETAILED DESCRIPTION OF THE INVENTION

Figure 4:
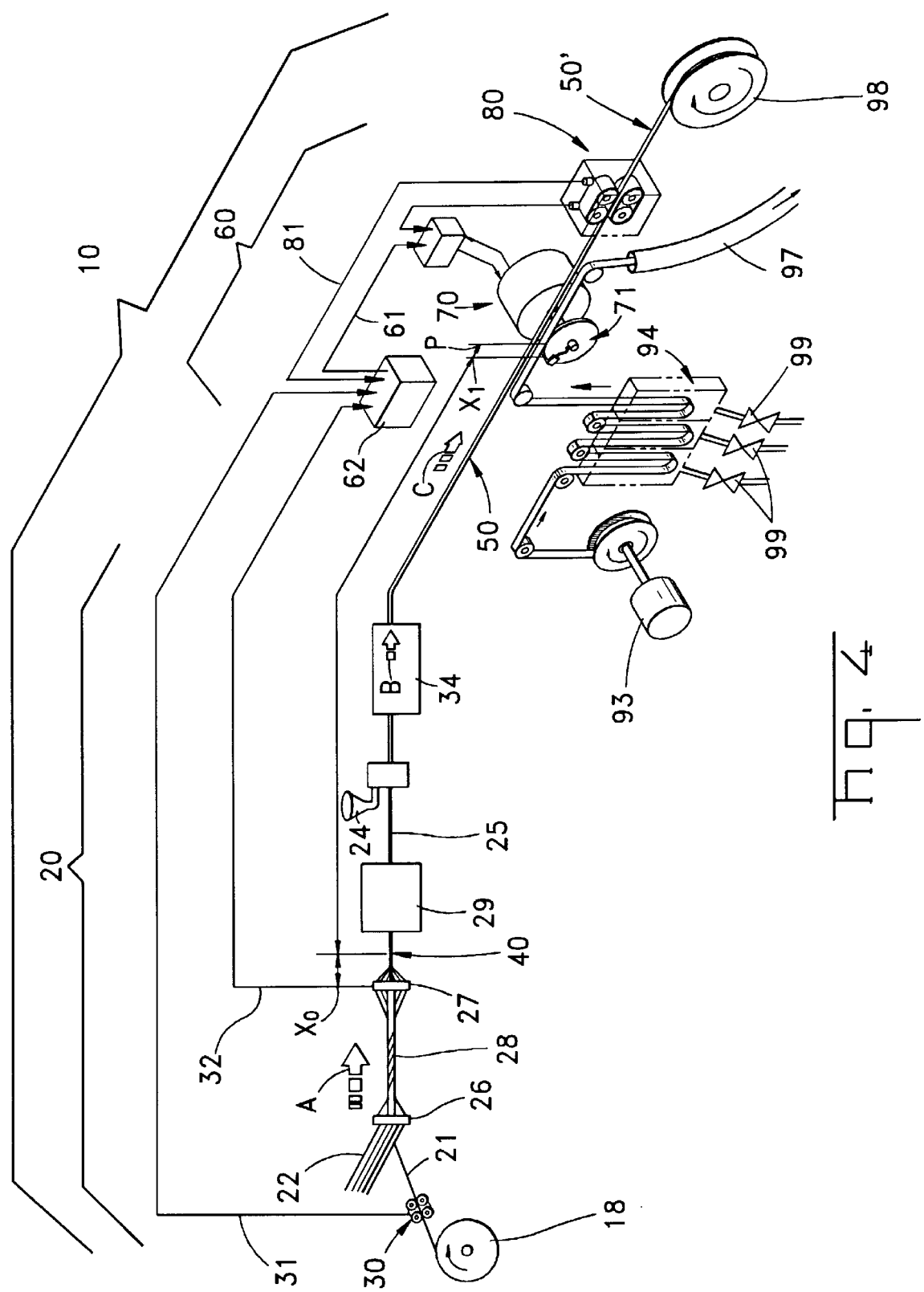
FIG. 4 is a schematic view of a cable manufacturing process according to the present invention.

Referring to FIG. 4, a manufacturing process 10 and a product 50,50' produced thereby will be described. Process 10 comprises a product making section 20 and an operation section 60. Product making section 20 is operative to produce, for example, a complete but unmarked cable product 50. Operation section 60 is operative to effect a manufacturing operation on product 50, for example, the indent marking of reversal points of product 50. A completed product 50' comprising markings over reversal points (FIG. 2) is then stored on a product storage device, for example, a take-up reel 98.

Product making section 20 may comprise a payoff reel 18, a line speed and length counter 30, a lay plate 26 through which buffer tubes 22 are stranded, an accumulator 28 through which central member 21 passes, and a second lay plate 27. Product making section 20 also includes a water-blocking tape applicator 29, a cross-head extruder 24, and a cooling trough 34. Cross-head extruder 24 comprises an extruder with a die the attached cross head. In an embodiment of the present invention, product making section 20 comprises a fiber optic cable making operation.

Figure 1:
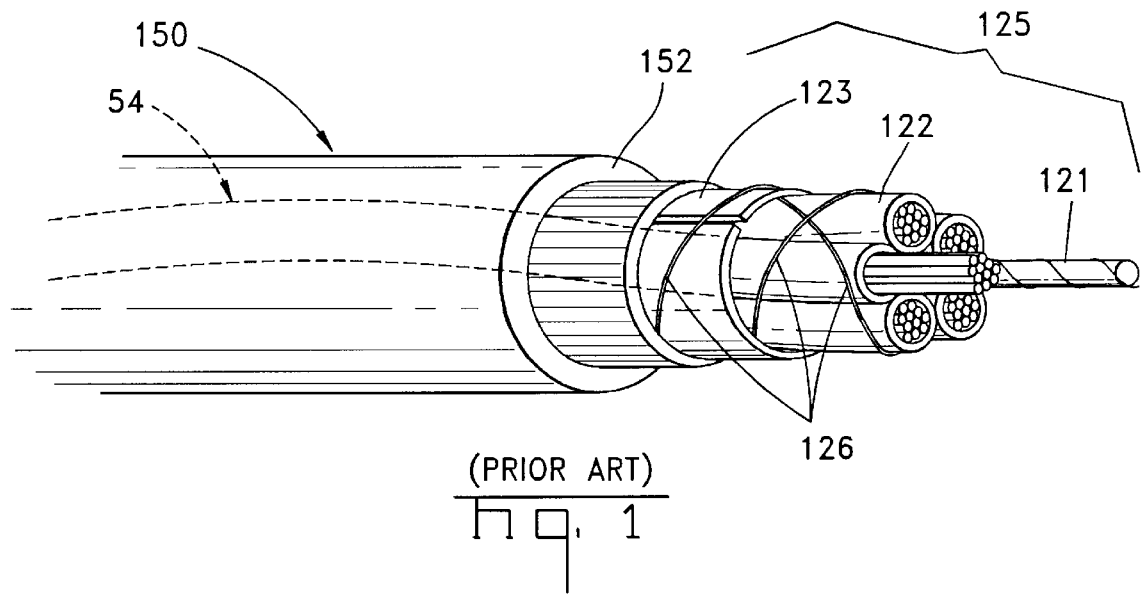
FIG. 1 is an isometric view of an unmarked cable product.
Figure 2:
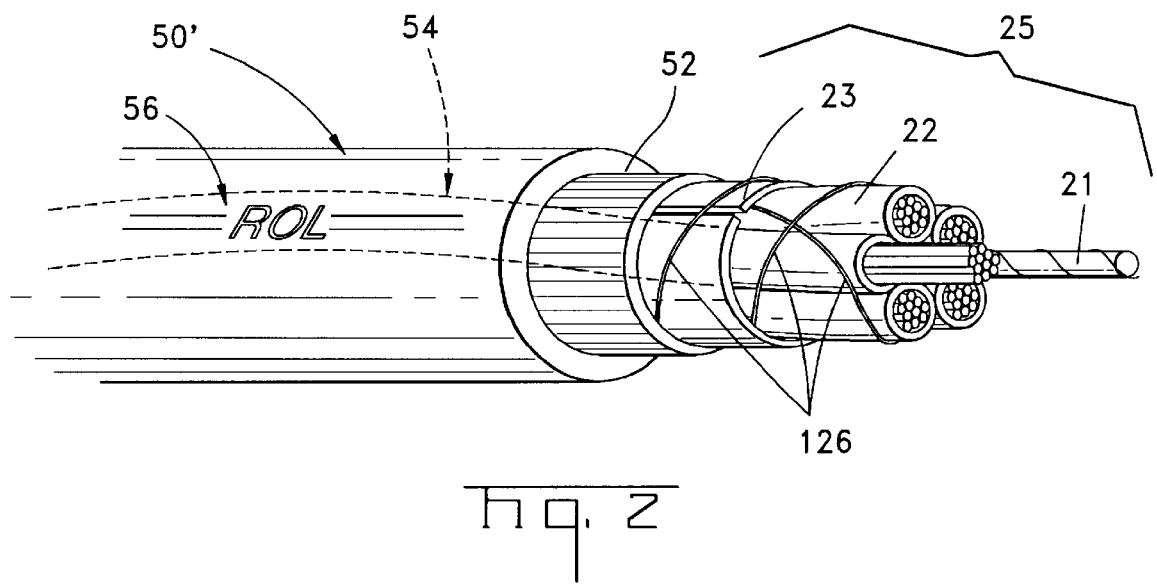
FIG. 2 is an isometric view of a marked cable product marked according to the process and apparatus of the present invention.

The direction of the flow of process 10 is indicated by arrows A, B, and C. As shown in FIG. 2, the components of a typical fiber optic cable comprise a central member 21 and buffer tubes 22 having at least one optical fiber therein. Other components may be used in the fiber optic cable making process, for example, filler members of solid cross section may be used instead of buffer tubes where the fiber count of the fiber optic cable so requires. Buffer tubes 22 may be stranded through lay plate 26, are wrapped around accumulator 28, and are stranded through lay plate 27. During the stranding process, buffer tubes 22 are stranded relative to central member 21 in alternating lay directions. More specifically, tubes 21 are stranded in a first lay direction about central member 21, the lay direction is then reversed by rotating lay plate 27 for a controlled interval of time, and buffer tubes 22 are then stranded in a second lay direction about central member 21. Each location along buffer tubes 22 at which the lay direction is reversed is termed the reversal point, e.g. as indicated at 54 in FIGS. 6–7. The reversal point represents the place where buffer tubes 22 are set at a fixed point 40 about central member 21.

Next, a water blocking tape 23 is longitudinally placed around buffer tubes 22, and what follows is a cable core 25 (FIG. 2). Core 25 is fed into extruder 24 whereby an outer jacket 52 is extruded around core 25. Core 25, surrounded by outer jacket 52, is then fed through cooling trough 34 which cools the outer jacket. What emerges is a complete but unmarked cable product 50. Unmarked cable product 50 is then fed into operation section 60.

Referring again to FIG. 4, operation section 60 comprises a logic function 62, an operating function 70, a sensor function 80, and a marking material accumulator 94. Logic function 62 comprises, for example, a programmable logic controller (PLC) with a comparator function. PLC 62 interfaces with various components, namely, speed monitor and length counter 30 via signal input lead 31, lay plate 27 via an input lead 32, sensor function 80 via an input lead 81, and operating function 70 via an output lead 61.

Operating function 70 includes an operating device 71 for performing a manufacturing operation on product 50. For example, in a fiber optic cable manufacturing operation, operating device 71 may comprise a print head type indent marking device for essentially permanently marking reversal points 54 (FIG. 2). However, skilled artisans will appreciate that operating device 71 may be adapted to mark other products as well, e.g. tubing, electrical cable, metal stock, fibers, plastic or other products. Referring again to FIG. 4, product making section 20 and operating section 60 comprise certain points along process 10, namely, points $X_0$, $X_1$, and P. The distance between fix point 40 and point $X_0$ is termed the initial distance, which distance defines generally the distance between lay plate 27 and fix point 40. The distance between fix point 40 and point $X_1$ is termed the offset distance. Point $X_1$ generally represents the place along process 10 at which operating device 71 is first activated. The distance between points $X_1$ and P is termed the activation distance. The activation distance is generally the distance cable product 50 travels between the time operating device 71 is first activated and the time print head 74 marks cable 50. The offset distance is entered into the computer memory of PLC 62 as a fixed value.

Figure 5:
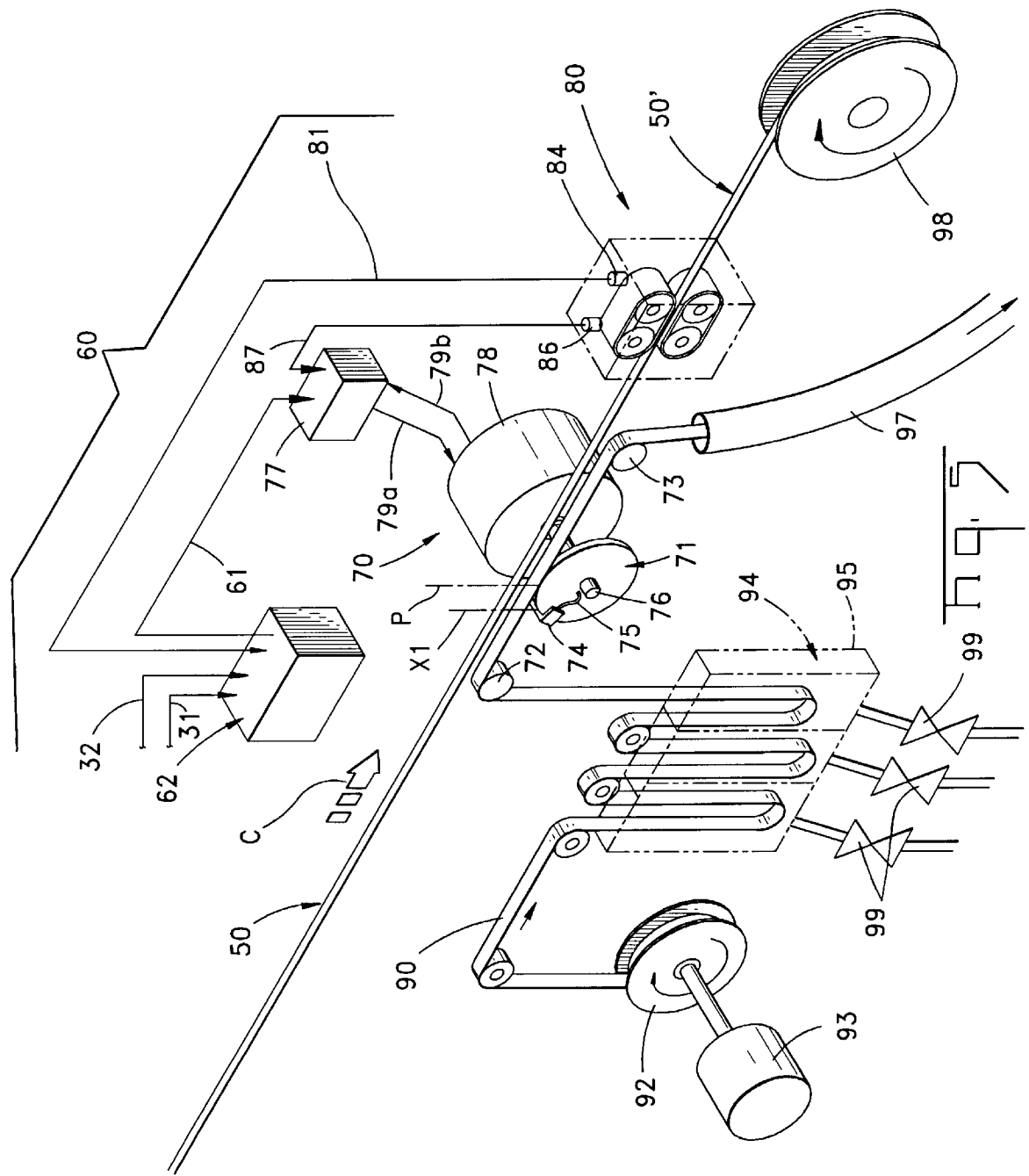
FIG. 5 is a close-up view of a portion of the cable manufacturing process of FIG. 4.

Referring to FIGS. 4 and 5, operating device 71 comprises a print head 74 comprising, for example, a hot foil type print head with raised alpha/numeric markings thereon suitable for indent marking product 50. A conventional temperature control feedback loop lead 75 supplies electrical power to heat print head 74. Operating device 71 is coupled to a shaft 76. Shaft 76 is coupled to a rotation-type servo-motor unit 78.

Servo-motor unit 78 is a conventional unit comprising a motor feedback sensor, for example, a servo-motor encoder. The servo-motor encoder of unit 78 interfaces with an electronic controller via a signal lead 79b whereby product position signal pulses are sent to the electronic controller. The electronic controller comprises, for example, a conventional motion control computer (MCC) 77.

MCC 77 may be characterized by its interfaces and functions. The two primary functions of MCC 77 comprise a motion control function and a programmable logic function; to accomplish these functions, MCC 77 relies on interfaces with other components. MCC 77 interfaces with logic function 62 via lead 61. Additionally, MCC 77 interfaces with sensor function 80 via an input lead 87, which lead is connected to a product sensor comprising a sensor 86. Sensor 86 is operatively associated with product 50' whereby sensor 86 can detect a product characteristic, for example the speed and length of the product, and send a product characteristic signal to MCC 77. Although sensor 86 senses speed and length product characteristics with a belt-driven type device, other speed sensing devices may be used as well, e.g. laser speed sensors or tachometers. Sensor 86 may be adapted to sense other product characteristics, for example, geometrical, thermal, photo-optical, or any other characteristic useful in evaluating process 10.

Figure 8:
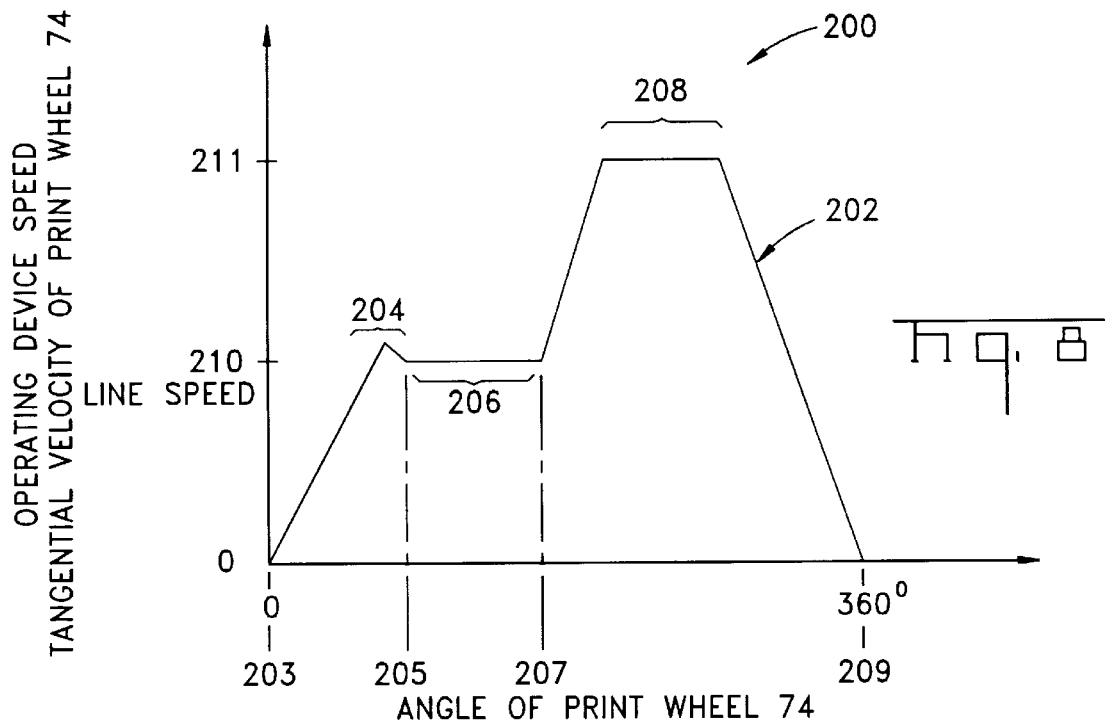
FIG. 8 is a graph of the tangential velocity of the print head of the present invention plotted as a function of angular displacement of the print head.

The motion control function of MCC 77 includes a servo-drive function for driving servo-motor 78 according to a programmed motion profile (FIG. 8). The servo-drive function is operative to command and maintain the speed and position of servo-motor 78 via lead 79a. Additionally, the motor control function of MCC 77 includes signal comparator and phase-locking functions. The comparator function compares the input speed signal from sensor 86 with the feedback signal from the encoder of servo-motor 78. The phase-locking function is operative to phase-lock the input speed signal from sensor 86 with the feedback signal from the encoder of servo-motor 78, and the phase-locking function is operative to actuate the servo-drive function so that print head 74 marks generally the precise location of a reversal point 54. The phase-locking function is based on, for example, the principle of proportional-integral-derivative (PID) feedback control, i.e. PID control. As will be described more fully below, the PID control of MCC 77 is operative to calculate a needed correction between commanded and actual positions of print head 74. Using this correction calculation, MCC 77 is operative to boost the velocity of print head 74 until the error is negligible and the actual position is approximately equal to the commanded position. The correction is completed by the time print head 74 makes contact with product 50. The PID control of MCC 77 therefore advantageously overcomes any acceleration delay of print head 74, which results in the marking of product 50 in the correct reversal point position at any product speed.

The programmable logic control function of MCC 77 controls tape accumulator 94. Additionally, a programmed temperature in MCC 77 controls the heat of print head 74 through temperature control feedback loop via lead 75. Sensor function 80 comprises: a length counting encoder 84 operatively connected to input lead 81; and an encoder 86 operatively connected to lead 87.

Accumulator system 94 is operative to provide a marking material 90 to print head 74, for example, a heat-sensitive tape material. Tape accumulator system 94 comprises a vacuum chamber housing 95 with level sensors (not shown) a feed motor 93 connected to a payoff reel 92, a suction hose 97, and suction valves 99. Marking material 90 is suspended adjacent to operating device 71 by guide rollers 72 and 73. Payoff reel 92 supplies accumulator 94 with marking material 90. Suction hose 97 is operatively arranged to collect spent marking material. Motor 93 and suction valves 99 are controlled by the programmable logic control function of MCC 77.

Figure 9:
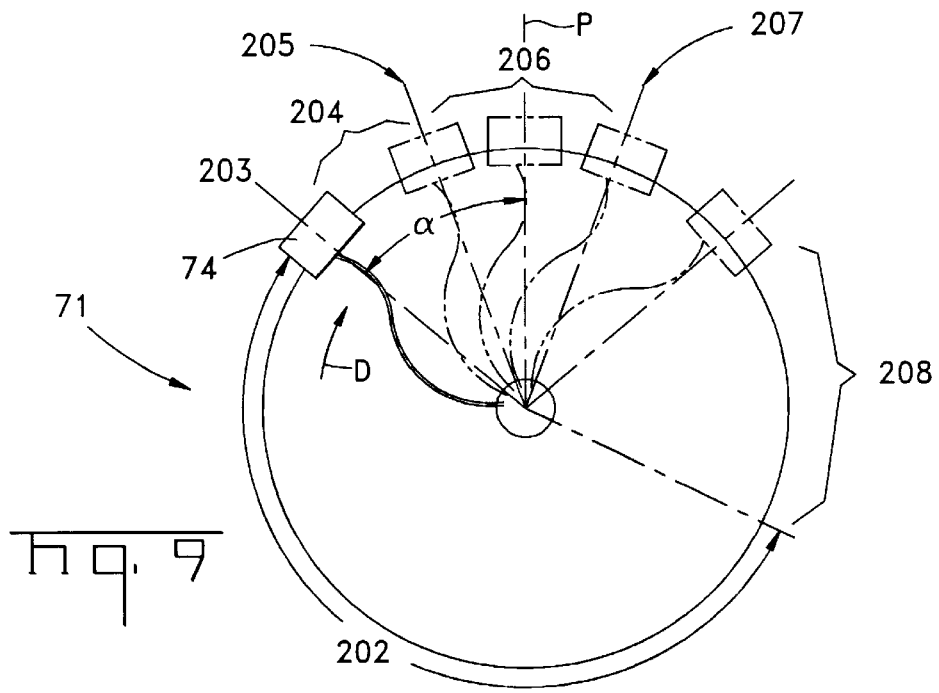
FIG. 9 shows the print head of the present invention through stages of one revolution.

FIG. 8 shows a chart 200 which depicts the programmed motion profile of operating device 71 as programmed into MCC 77 and FIG. 9 shows the various stages of motion of operating device 71 during one revolution. Chart 200 shows a profile 202 of the tangential velocity of print head 74 plotted as a function of angular displacement of print head 74. Point 203 indicates the initial condition, i.e. starting position, of the print head (FIG. 6), and also the stopping position at the end of a revolution. At the initial condition, the angular displacement and operating device speed of print head 74 are zero, i.e. point 203.

With reference to the foregoing, operation of process 10 will now be described. First, a dummy cable (not shown) is placed with an end attached to central member 21 adjacent length counter 30, with counter 30 set at a zero value. The dummy cable is routed through product making section 20 and operation section 60 as the cable 50 is formed, thereby initiating length and speed information from sensor function 80 to PLC 62. As cable 50 is formed, central member 21 initiates counter 30, which in turn sends length and speed information to PLC 62 via lead 31. The cable length currently passing counter 30 is termed the current length value. When lay plate 27 is rotated to form a reversal point 54, a signal reflecting this event is sent to PLC 62 via lead 32. PLC 62 records the current length value at which lay plate 27 was reversed, and adds the offset distance and line distance values to the current length value, which sum is termed the first-in-first-out length value (FIFO value). The FIFO value is recorded in a first-in-first-out queue. Assuming here that a state of zero strain exists on product 50, the comparator function of PLC 62 continuously compares the current length and FIFO values, when the comparator function of PLC 62 determines that they are equal, PLC 62 triggers an initiate-print-signal.

When PLC 62 triggers the initiate-print-signal, the signal is received by MCC 77 at about the time a reversal point 54 reaches point X1 (FIG. 5). The comparator function of MCC 77 compares the line speed signal via sensor 86, and the feedback signal from the encoder of servo-motor 78. MCC 77 then phase-locks the signals together according to a ratio profile 202 (FIG. 8) which is programmed into MCC 77, whereby execution of the profile commands the translational parameters of print head 74, for example, the position and velocity parameters of print head 74.

Between points 203 and 207 of profile 202, based on the line speed input of encoder 86, and the radius value of print head 74 as programmed into MCC 77, MCC 77 will calculate the proper angular velocity at which servo-motor 78 must be driven to achieve a desired tangential velocity of print head 74. It is desired that the tangential velocity of print head 74 be accelerated from a rest position at point 203 to equal the line speed 210 of product 50 before point 205 (FIG. 9). That is, before print head 74 makes contact with product 50 the tangential velocity of print head 74 will be equal to or greater than line speed 210, as shown at segment 204. Angle α is the angle that print head 74 subtends between point 203 and the center of segment 206. As print head 74 moves through angle α, the outer circumference thereof moves a circumferential distance (CD). Distance CD is calculated using the formula: CD=[(angle α÷360°)]* [2*π* radius of print head 74]. Since the phase-locking function of MCC 77 phase-locks the print head velocity with the line speed of product 50, distance CD of print head 74 will be equated to the activation distance of product 50, i.e. the distance between points X1 and P (FIGS. 5–6). Phase-locking can occur where product 50 is accelerating, moving at constant speed, or decelerating.

The ratio profile is theoretical because it assumes that print head 74 can be accelerated, immediately from initial position 203 to the tangential velocity of print head 74 at point P, i.e. equal to the line speed of product 50. However, in actual practice there is some delay in acceleration of print head 74 due to, for example, inertial effects of the print head mass and response time of the control system. To counteract this delay, the PID control of MCC 77 tracks the commanded position and the actual position of print head 74, and calculates an error therebetween. The PID control then calculates a position correction. Using this correction, MCC 77 boosts the tangential velocity of print head 74 until the error is negligible and the actual position and velocity of print head 74 are approximately equal to the position and velocity commanded by the PID control. The correction is completed by the time print head 74 makes initial contact with product 50 at point 205 (FIGS. 8–9). Thus MCC 77 uses the PID control to overcome any acceleration delay of print head 74, and that reversal point 54 and print head 74 reach point P at substantially the same time (FIG. 7).

Execution of profile 202 results in print head 74 pressingly engaging tape 90 and thereby impressing a marking on cable 50. Therefore, it is during profile segment 206 that a facsimile of the symbols, letters, and/or numbers of print head 74 are permanently marked on cable 50, for example, marking 56 "ROL" (FIG. 2), i.e. reverse-of-lay. Marking 56 is made at generally the precise location of a reversal point 54. A craftsman will be able to locate the marking, cut product 50' at marking 56, remove jacket 152 and expose core 25 at reversal point 54. Reversal point 54 is the area of maximum slack in buffer tubes 122, thereby facilitating the mid-span access process for splicing or connectorization.

Referring back to FIGS. 8–9, at the terminus 207 of segment 206, the printing operation is complete, and print head 74 is no longer in contact with cable 50. From point 207, motion profile 202 accelerates print head 74 to about twice the line speed 211 for a duration 208. Accelerating to twice the line speed quickly returns print head 74 back to a zero position 209 of FIG. 8, i.e. the speed and angular displacement of print head 74 are again zero. A complete 360° revolution of operating device 71 has thus been made, and operating device 71 is ready for the next cycle, before the next reversal point 54 of product 50 reaches point P.

After a series of marking cycles, motor 93 of tape accumulator 94 is now activated by the logic function of MCC 77 to feed fresh tape 90 to operating device 71. As this occurs, tape 90 is drawn from chamber 95. Chamber 95 is replenished with tape by activation of suction valves 99 which draw tape 90 down into chamber 95. Accumulator 94 is then ready for the next series of cycles.

The present invention operates on the principle of position data indicating the position of reversal point 54 to MCC 77. As noted above, when the initiate-print-signal is sent reversal point 54 is generally located at point $X^1$. From generally the time PLC 62 sends the initiate-print-signal until the time the reversal point reaches point P (FIG. 7) reversal point 54 will move along the activation distance from point $X_1$ to point P. The activation distance is programmed into MCC 77 as a number of signal pulses between point $X_1$ and point P so that print head 74 will always reach point P, at the proper speed, and in time to mark reversal point 54. Encoder 30 and the servo-motor controller encoder may use square wave type pulses indicating the position data of reversal point 54. The phase-locking function of MCC 77 is based on position data, independent of line speed; however, line speed can be measured as the frequency of signal pulses and used to drive print head 74 from zero to twice the line speed.

As noted above, the foregoing embodiment of process 10 has assumed a state of zero strain on product 50'. Practice of the foregoing embodiment may, however, result in product 50' being placed in a state of strain. In a preferred embodiment of the present invention, operation section 60 comprises a strain compensating function which is operative to compensate for strain placed on product 50' during manufacturing process 10.

Strain is a unit-less number, often expressed as a percent value. Strain on product 50' is generally a function of the modulus of elasticity of the materials comprising product 50' and the tension placed on product 50'. For example, longitudinal compression is created by the cooling of jacket 52 in trough 34, tension may be created by the integration of an armor layer into product 50', and/or by the pulling force of take up reel 98. Strain may affect product 50' in either positive or negative modes. Where the strain is positive, the overall length of the product is increased. Where strain is negative the length of the product is shortened. In either event, the initiate-print-signal must be sent at generally precisely the right time to assure that marking 56 will be placed adjacent reversal point 54.

A logical program comprising the strain compensating function is programmed in PLC 62. Input into the program comprises: signal pulses representing length of product 50 from position encoder 30 via lead 31; and signal pulses representing length of product 50 from encoder 84 via lead 81. PLC 62 reads the signal pulses from encoder 30 and records a length value C1 of product 50 passing therethrough. Likewise, PLC 62 reads the signal pulses from encoder 84 and records a length value C2 of product 50' passing therethrough. The program samples C1 and C2 at a set sample rate, preferably a sample rate whereby three samples of product length data will be taken during the interval of time it takes a given section of product 50 to travel the offset length. For a given sample set C1, C2, PLC 62 subtracts C1 from C2 and evaluates the difference, if any. If the difference is a positive number, then product 50' has been stretched, i.e. it has elongated under positive strain. On the other hand, if the difference is a negative number product 50' has shrunk under negative strain.

Next, the strain compensating function calculates the strain by dividing the difference by C1, which yields a percent value. The program then sets C2 equal to C1 and begins to read the corresponding signal pulses in preparation for the next cycle. Three samples of C1, C2 and iterations of calculating the percent values yields three distinct percent values. A given percent value is then multiplied by the offset distance which yields a length product, i.e. a strain error measurement value. The absolute value of the length product is then algebraically subtracted from the FIFO value to define the strain sum. The comparator function of PLC 62 then compares the strain sum to the current length value as generated by encoder 84. When the comparator determines that the strain sum and the current length value per encoder 84 are equal, PLC 62 triggers an initiate-print-signal.

In view of the foregoing, an elongated product 50 will experience stress creating positive strain, the additional cable length is a positive number subtracted from the FIFO value to calculate the strain sum. However, the strain sum will be equal to the current value C2 prior in time as compared to process 10 where there was zero strain on product 50'. Therefore, elongation of product 50' is compensated for by having the initiate-print-signal sent relatively earlier in time.

On the other hand, where a shrunken product 50' experiences stress resulting in negative strain, the negative strain makes the cable shorter, the lessened length is a negative number algebraically subtracted from the FIFO value generated by C1 of encoder 84 to calculate the strain sum. However, the strain sum will be equal to the FIFO value later than the current length value per C1 as compared to process 10 where there was zero strain on product 50'. Therefore, negative strain is compensated for by having the initiate-print-signal sent relatively later in time. For example, where product 50' comprises a cable product, an armored cable product may experience positive strain, and a non-armored duct cable may experience negative strain. In either event, the strain compensating function of PLC 62 assures that reversal point 54 will be appropriately indicated by a marking 56 so that a craftsman will be able to locate the reversal point and cut the cable accordingly.

The present invention has thus been described with reference to the foregoing embodiments, which embodiments are intended to be illustrative rather than limiting. Persons of skill in the art will appreciate that variations and modifications of said embodiments may be made without departing from the scope of the appended claims. For example, although embodiments of the present invention have been described with reference to a fiber optic cable product, the present invention may be used with such products as, e.g., paper, wire, rope, textiles, and optical fiber. Additionally, although the strain compensating function of the present invention has been described with reference to a FIFO value based system, a current length value based system may be used as well. The length based system would algebraically add the strain error value to the current length value for positive strain, and algebraically add the strain error from the current length value for negative strain. Furthermore, although the foregoing embodiment describes the logic functions of PLC 62 and MCC 77 as separate units, persons of ordinary skill in the art will appreciate that the scope of the appended claims may include having the logic functions in a separate or a single unit.

Accordingly, what is claimed is:

1. An apparatus for performing an operation on a fiber optic cable product, comprising:
   (a) an operating device, said operating device is operative to perform an operation on said fiber optic cable product;
   (b) a motor, the motor is operatively associated with said operating device for driving said operating device, and the motor comprises a motor feedback sensor for sensing a motor characteristic and producing a feedback signal;
   (c) a product sensor operatively associated with said product, whereby said product sensor is operative to send a product characteristic signal;
   (d) an electronic controller, the electronic controller comprises a phase-locking function, the electronic controller is operatively associated with said motor for controlling said motor by an output signal to said motor, said electronic controller is operatively connected to said motor feedback sensor and said product sensor and is operative to read said feedback and product characteristic signals;
   (e) whereby, upon initiation of said electronic controller, said electronic controller phase-locks the product characteristic signal and the feedback signal according to a ratio profile, and thereby controls the motor via the output signal from the electronic controller to the motor, the motor drives said operating device for performing said operation on said fiber optic cable product.

2. The apparatus of claim 1, wherein said operating device comprises a marking device for marking said fiber optic cable product.

3. The apparatus of claim 2, wherein said marking device comprises an indent marking device.

4. The apparatus of claim 1, wherein said operating device is accelerated by said motor upon initiation of said electronic controller according to said profile.

5. The apparatus of claim 1, wherein said motor comprises a servo-motor.

6. The apparatus of claim 1, wherein said product sensor comprises a length encoder for measuring the length of said fiber optic cable product.

7. The apparatus of claim 1, wherein said electronic controller comprises a motion control computer.

8. The apparatus of claim 1, wherein said apparatus comprises a PLC, said PLC being operatively associated with said electronic controller whereby said PLC is operative to initiate said electronic controller for performing said operation on said fiber optic cable product.

9. The apparatus of claim 1, wherein said electronic controller is operative to drive said operating device via said output signal from the electronic controller to the motor according to a programmed motion profile programmed into said electronic controller.

10. The apparatus of claim 1, wherein said operating device comprises a rotatable portion.

11. The apparatus of claim 1, wherein said operating device comprises a heated portion.

12. The apparatus of claim 1, wherein said operating device comprises alpha/numeric markings for marking said fiber optic cable product.

13. The apparatus of claim 1, wherein said operating device comprises a print head for performing said operation.

14. In a method of performing a manufacturing operation on a fiber optic cable product, comprising the steps of:
   (a) recording data of said product as said product moves along a production line in the form of product characteristic values;
   (b) calculating a strain value which is proportional to stress-induced strain acting on said product; and
   (c) compensating for the strain in said product by modifying said one of said product characteristic values by adding the strain value to said one product characteristic value to define a strain sum.

15. The method according to claim 14, comprising the step of:
   (d) sending a signal to an operating function, whereby the operating function performs an operation on said product.

16. The method according to claim 15, wherein said operating function comprises activating a marking device whereby a mark is made on said product.

17. The method according to claim 16, wherein said fiber optic cable product comprises a reversal point, said mark being made generally precisely at said reversal point.

18. The method according to claim 16, wherein activating said marking device comprises rotation of a print head.

19. The method according to claim 14, wherein said one product characteristic value comprises a length value proportional to a length of said product.

20. In a method for performing a manufacturing operation on a fiber optic cable product having a reversal point, comprising the steps of:
   (a) calculating a strain value acting on said fiber optic cable product as said product is moving along a cable manufacturing line; and
   (b) multiplying a length of said fiber optic cable product by the strain value to define a length product.

21. The method of claim 20, comprising the step of:
   (c) adding the length product to a FIFO value to define the strain sum.

22. The method of claim 21, comprising the step of:
   (d) comparing the strain sum to a current length value, and where the strain sum and current length value are equal, initiating said manufacturing operation.

23. The method of claim 22, wherein said manufacturing operation comprises the step of marking said fiber optic cable reversal point.

24. In a method of performing a manufacturing operation on a fiber optic cable product in a fiber optic cable production line, comprising the steps of:
   (a) providing said fiber optic cable product, said fiber optic cable product being moveable in said fiber optic cable production line;
   (b) at a first location in said production line, recording data of said cable product, said data indicating a translational parameter of a feature of said cable product;
   (c) using said translational parameter data to calculate a strain value, said strain value being proportional to stress-induced strain of said cable product;
   (d) providing a marking apparatus; and
   (e) at a second location of said production line, operating said marking apparatus whereby said marking apparatus makes a mark, on the fiber optic cable product, at the location of said feature.

25. The method of claim 24, wherein said feature comprises a lay direction reversal point, said mark being made generally precisely on said cable at said reversal point of said fiber optic cable.

26. The method of claim 24, wherein the marking apparatus comprises an indent marking machine which indent marks the location of said feature on said cable.

27. The method of claim 24, wherein the marking apparatus comprises a heated section which marks the location of said feature on said cable.

28. The method of claim 24, wherein said translational parameter of said feature comprises a position of said feature.

29. In a method of performing a manufacturing operation on a fiber optic cable in a fiber optic cable production line, comprising the steps of:
   (a) at a first location in said fiber optic cable production line, recording data of said product in said production line, said data indicating a feature of said fiber optic cable;
   (b) providing a marking device, said marking device is operative to mark the location of said feature at a second location of said production line;
   (c) providing a motion controller, said motion controller is operative to control said marking device for marking said fiber optic cable product;
   (d) sensing a translational parameter of said feature in said fiber optic cable product;
   (e) activating said marking device, establishing a commanded translational parameter for said marking device, and sensing an actual translational parameter of the marking device;
   (f) calculating an error between the commanded and actual translational parameters of said marking device;
   (g) calculating a translational parameter correction, and controlling the translational parameter of said marking device until the error is negligible;
   (h) whereby said marking device marks generally the precise location of said fiber optic cable feature.

30. The method of claim 29, wherein said feature comprises a reversal point, said mark being made generally precisely at said reversal point of said fiber optic cable.

31. The method of claim 29, wherein the marking apparatus comprises an indent marking machine which indent marks the location of said feature.

32. The method of claim 29, wherein the marking apparatus comprises a heated section which marks the location of said feature.

33. The method of claim 29, wherein said translational parameter of said feature comprises a position of said feature.

34. The method of claim 29, wherein said translational parameter of said feature comprises a speed of said feature.

35. An apparatus for performing an operation on a fiber optic cable product, comprising:
- (a) a PLC, said PLC monitors the position of a product characteristic feature of said cable product;
- (b) an operating device, said operating device is operatively associated with said PLC, and said operating device comprises a print head for marking said cable; and
- (c) said PLC actuates said operating device and said print head and marks said cable product at the location of the product characteristic feature.

36. The apparatus of claim 35, wherein said marking device comprises an indent marking device.

37. The apparatus of claim 35, wherein said operating device is operatively associated with a MCC which accelerates said print head according to a programmed motion profile for marking said cable.

38. The apparatus of claim 35, wherein said operating device comprises a heated portion.

39. The apparatus of claim 35, wherein the product characteristic feature is a reversal point in said cable.

* * * * *